US007254385B2

(12) United States Patent
Atkin et al.

(10) Patent No.: US 7,254,385 B2
(45) Date of Patent: *Aug. 7, 2007

(54) SYSTEM AND METHOD OF AUTOMATIC CONVERSION OF UNITS OF MEASURE IN A WIRELESS COMMUNICATION NETWORK

(75) Inventors: Steven Edward Atkin, Austin, TX (US); Scott E. Garfinkle, Austin, TX (US); Amir Farrokh Sanjar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 770 days.

This patent is subject to a terminal disclaimer.

(21) Appl. No.: 10/383,303

(22) Filed: Mar. 6, 2003

(65) Prior Publication Data

US 2004/0176115 A1 Sep. 9, 2004

(51) Int. Cl.
*H04M 3/42* (2006.01)
(52) U.S. Cl. .................. 455/414.1; 455/414.4
(58) Field of Classification Search ............... 455/3.01, 455/3.06, 404.2, 412.1, 414.1, 404.1, 414.2, 455/414.4, 432.2, 456.1, 456.3, 466
See application file for complete search history.

(56) References Cited

U.S. PATENT DOCUMENTS

| | | | |
|---|---|---|---|
| 6,308,087 B1 * | 10/2001 | Aoshima | 340/7.28 |
| 6,323,767 B1 | 11/2001 | Gropper | 340/534 |
| 6,369,720 B1 | 4/2002 | Wilhelm | 340/905 |
| 6,407,673 B1 | 6/2002 | Lane | 340/901 |
| 2002/0022498 A1 * | 2/2002 | Hokao | 455/556 |
| 2002/0035467 A1 | 3/2002 | Morimoto et al. | 704/9 |
| 2002/0116172 A1 | 8/2002 | Vargas | 704/8 |
| 2002/0123361 A1 * | 9/2002 | Bae | 455/517 |
| 2002/0142783 A1 | 10/2002 | Yoldi et al. | 455/456 |
| 2002/0161666 A1 | 10/2002 | Fraki et al. | 705/26 |
| 2002/0177428 A1 | 11/2002 | Menard et al. | 455/404 |

FOREIGN PATENT DOCUMENTS

| | | |
|---|---|---|
| JP | 2000261573 | 9/2000 |
| JP | 2002041844 | 2/2002 |
| WO | WO 01/26393 | 4/2001 |

* cited by examiner

*Primary Examiner*—Benny Q Tieu
(74) *Attorney, Agent, or Firm*—Duke W. Yee; Libby Z. Handelsman; Wayne P. Bailey

(57) ABSTRACT

A system and method for automatic conversions of units of measure in a wireless communication network are provided. With the system and method, when a wireless communication device enters a region of a wireless network, the wireless communication device registers with the wireless network. The registration includes the creation of a database entry at the mobile switching center that includes an indication of the origin, such as the country code, of the wireless communication device. Based on this indication of origin, a conversion function may be identified for converting of units of measure to a format that is most likely to be understood by a user of the wireless communication device. When a text based message is sent to the wireless communication device, the text message is received by the mobile switching center which determines how to route the text message and parses the text message to identify any portions of the text message that include a unit of measure that may need to be converted. These identified units of measure are then converted using the conversion functions identified based on the identification of origin. The text message with the converted units of measure is then routed to the destination wireless communication device.

27 Claims, 2 Drawing Sheets

SYSTEM AND METHOD OF AUTOMATIC CONVERSION OF UNITS OF MEASURE IN A WIRELESS COMMUNICATION NETWORK

BACKGROUND OF THE INVENTION

1. Technical Field

The present invention is directed to a system and method for automatic conversion of units of measure in a wireless communication network. More specifically, the present invention is directed to conversion of units of measure in messages sent to a wireless communication device wherein the conversion is based on an identification of origin of the user of the wireless communication device.

2. Description of Related Art

Various measurement systems have been devised and used in various countries of the world. The predominate measurement systems are the English and the Metric systems. Because different countries use different ones of these measurement systems, it is sometimes difficult for travelers to understand information being provided to them.

Lack of immediate access to understandable measurement information to travelers has resulted in numerous mistakes and discomfort to foreign travelers around the world. For example, a traveler may not be prepared for the day's weather due to the lack of understanding of temperature measurement (Fahrenheit vs. Centigrade) of the local weather forecast or may be unable to follow directions based on problems converting between Metric and English distances.

Currently there are numerous devices for travelers that address these sorts of problems but they are not automatic and often require a traveler to carry yet another piece of hardware. A device which has not been well-utilized for this purpose is the cellular telephone. Currently, the only conversions available via a cellular telephone are via web-based lookup or manually-configured personal digital assistant (PDA) based applications for cellular telephones with integrated PDAs. These applications must be specifically invoked by the user of the cellular telephone and actively interfaced with to perform such conversions.

Therefore, there is a need for a system and method for automatically performing conversions of units of measure in a wireless communication network.

SUMMARY OF THE INVENTION

The present invention provides a system and method for automatic conversions of units of measure in a wireless communication network. With the system and method of the present invention, when a wireless communication device, such as a cellular telephone, enters a region, such as a cell, of a wireless network, the wireless communication device registers with the wireless network by way of a base station and mobile switching center. The registration of the wireless communication device includes the creation of a database entry at the mobile switching center that identifies the wireless communication device and includes an indication of the origin, such as the country code, of the wireless communication device. Based on this indication of origin, a conversion table may be identified for converting of units of measure to a format that is most likely to be understood by a user of the wireless communication device.

When a text based message is sent to the wireless communication device, the text message first is received by the mobile switching center. The mobile switching center determines how to route the text message so that it is received by the intended wireless communication device. In addition, during this routing determination, the mobile switching center parses the text message to identify any portions of the text message that include a unit of measure that may need to be converted. These identified units of measure are then converted using the conversion table identified based on the identification of origin. The text message with the converted units of measure is then routed to the destination wireless communication device.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a system and method for automatically converting units of measure in a text message to a more understandable format based on an identification of an origin of a wireless communication device in a wireless communication network. While the present invention will be described, with regard to exemplary embodiments, in terms of a cellular telephone and a cellular network, the present invention is not limited to such. Rather, the present invention may be used with any wireless communication device and any type of wireless communication network. For example, the wireless communication devices may include digital wireless telephones, personal digital assistants, pager devices, portable computing devices, and the like. The wireless communication network may be a digital wireless communication network, such as a PCS network, a satellite based communication network, or the like.

Figure 1:
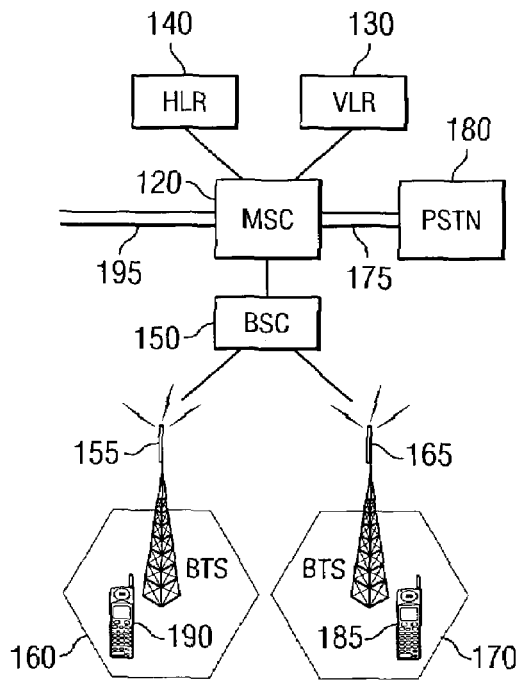
FIG. 1 is an exemplary diagram illustrating a portion of a wireless communication network in accordance with the present invention.

With reference now to the figures, FIG. 1 is an exemplary diagram illustrating a cellular communication system 100 according to the present invention. In FIG. 1 cellular network 100 includes a Mobile Switching Center (MSC) 120 connected to a Visitor Location Register (VLR) 130 and also to a Home Location Register (HLR) 140. A Base Station Controller (BSC) 150 is connected to MTSO 120. The BSC 150 is further connected to a Base Transceiver Station (BTS) 155 within a cell 160. A further BTS 165 within a cell 170 is also connected to BSC 150. A voice channel 175 is shown interconnecting public switched telephone network (PSTN) 180 and MSC 120. Within cell 170 there is shown a mobile subscriber (MS) 185. Within cell 160 is another MS 190.

The Visitor Location Register (VLR) 130 is a network entity responsible for storing roaming information related to a mobile subscriber. The roaming information includes information related to the identity of the mobile subscriber as well as address information to be used for contacting the roaming mobile subscriber.

The Home Location Register (HLR) 140 is a network entity responsible for storing subscription information related to mobile subscribers for which the cellular network 100 is the mobile subscriber's home network. Such information may include, for example, identities of the mobile subscribers, address information for use when calling the mobile subscribers, call forwarding information, and the like.

The Base Transceiver Stations (BTS) 155 and 165 send and receive cellular communications to and from the mobile subscribers 185 and 190. The Base Station Controller (BSC) 150 routes cellular communications to the appropriate cell 160 or 170, based on routing information supplied by the Mobile Switching Center (MSC) 120, and coordinates communications between BTSs (e.g., handoff between BTSs). The MSC 120 provides cellular communication services based on information obtained from the HLR 140 and VLR 130 of the cellular network 110. The MSC 120 provides routing information to the BSC 150 for use in routing the cellular communication to an appropriate cell in which the receiving mobile subscriber is located The BSC 150 is a base station controller which coordinates calls between BTSs 155 and 165 (e.g., handoff between BTSs).

The MSC 120, VLR 130 and HLR 140 entities may or may not be co-located. If they are not co-located, the MSC 120 is responsible for transferring information to and from the VLR 130 and HLR 140 whenever applicable.

In addition to the above, the cellular network 110 may be connected to other cellular networks via a wired or wireless connection 195. Moreover, while only two cells are illustrated in FIG. 1, the present invention is not limited to such and any number of cells may be included in the cellular network 110 without departing from the spirit and scope of the present invention.

As mentioned previously, the present invention provides a system and method for automatic conversions of units of measure in a wireless communication network, such as cellular communication network 100. With the system and method of the present invention, when a wireless communication device, such as a cellular telephone 190, enters a region, such as a cell 160, of a wireless communication network 100, the wireless communication device 190 registers with a mobile switching center 120 of the wireless communication network 100 by way of a base transceiver station 155 and base station controller 150.

The registration of the wireless communication device includes the creation of a database entry in one of the home location register 140 or the visitor location register 130 associated with the mobile switching center 120 that identifies the wireless communication device 190 and includes an indication of the origin, such as the country code, of the wireless communication device 190.

If the wireless communication device 190 is located in its home wireless communication network, then the database entry is created in the home location register 140. If the wireless communication device 190 is a visitor to the wireless communication network, i.e. the wireless communication network is not its home wireless communication network, then the database entry is created in the visitor location register 130.

The indication of origin in the exemplary embodiments described herein is a country code that identifies the origin of the user of the wireless communication device 190. However, the present invention is not limited to such and any identification of origin of the user of the wireless communication device 190 may be used without departing from the spirit and scope of the present invention. For example, the user may set a profile in the wireless communication device 190 in which the user identifies a country to be his/her origin. Any identifier of this country may be used with the present invention. Alternatively, the user may select a particular language and/or measurement system to be used with text messaging in the user's profile in the wireless communication device 190. Based on the identification of origin, which may be a country code, a designation of a measurement system to be used, a designation of language to be used, or the like, the present invention performs conversion of units of measure in text messages sent to the wireless communication device 190 to a format that is more readily understandable to a person that originates from the identified country or uses the identified measurement system or language.

When a text based message is sent to the wireless communication device 190, the text message first is received by the mobile switching center 120. This text message may be a message that is sent by another user of a wireless communication device 190, such as cellular telephone 185, an automated message that is transmitted to the wireless communication device 190, a text message sent to the wireless communication device 190 in response to a request from the wireless communication device 190, or the like.

The mobile switching center 120 receives the text message and determines how to route the text message so that it is received by the intended wireless communication device 190. In addition, during this routing determination, the mobile switching center 120 parses the text message to identify any portions of the text message that include a unit of measure that may need to be converted. These identified units of measure are then converted using conversion functions identified based on the identification of origin. The text message with the converted units of measure is then routed to the destination wireless communication device.

Figure 2:
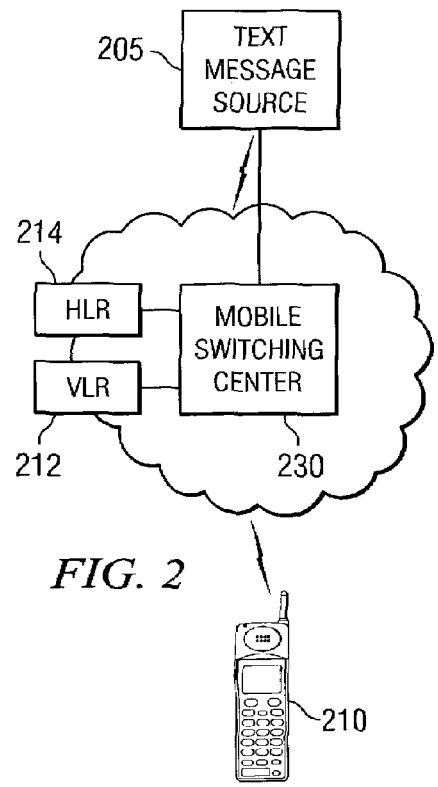
FIG. 2 is an exemplary diagram illustrating an exemplary operation of the present invention.

FIG. 2 illustrates the overall operation of the present invention from the view of a distributed data processing system. A shown in FIG. 2, a text message source 205 is located remotely from the wireless communication device 210. The text message source 205 and wireless communication device 210 may communicate over wireless communication network 220. The mobile switching center 230 is provided for routing of communications and facilitating the conversion of unit of measure information in text messages among other functions. Within this description, a unit of measure is any quantitative value, e.g., a distance measurement (inches, meters, yards, etc.), a time measurement (seconds, hours, days), a volume measurement (liters, gallons, etc.), a currency value (dollars, yen, pounds, marks, etc.), and the like.

The mobile switching center 230 may provide all of the functionality of the present invention as a service to the wireless communication device 210. That is text messages are transmitted to the wireless communication device 210 via the mobile switching center 230 which performs the functions of the present invention to convert unit of measure information in the text message to a format that is more readily understandable to the user of the wireless communication device 210 before routing the text message to the wireless communication device 210. In order for the mobile switching center 230 to perform such functions, the wireless communication device 210 must register with the mobile switching center 230. That is, the wireless communication device 210 must have a database entry in either of the visitor location register 212 or the home location register 214. This database entry may include, for example, the country identifier or other identifier of origin of a user of the wireless communication device 210.

In the mobile switching center 230, when a text message is received, the text message includes a header that identifies the intended destination of the text message, such as a device identifier, telephone number, or the like. This identifier of the destination device may be used as a way of looking up a database entry in the visitor location register 212 and/or home location register 214 for the destination device. Based on this database lookup, the mobile switching center 230 may determine the format that the user of the destination device either wishes to view unit of measure values or is most likely to understand. For example, if the user of the wireless communication device 210 has an origin in the United States, the unit of measure values that are most likely to be understood by the user are English measurement system values and U.S. dollar currency values.

The mobile switch center 230 then, or at approximately the same time as the lookup of the database entry for the destination device, parses the received text message, i.e. the text data of the text message, to identify unit of measure values that are candidates for conversion. A database of patterns that indicate unit of measure information is provided and used during the parsing of the text data to identify segments of the text data that may include unit of measure information. For example, the text data may be tokenized, i.e. broken up into segments or tokens, and the text data in each segment or token then compared to the list of patterns in the pattern database. If a segment includes one or more of the patterns, then the segment is indicated as being a candidate segment for having unit of measure information therein.

For example, the text data segments may each be compared to pattern information such as "$", "centigrade", "liters", "inches", "meters", "gallons" or the like. If a text data segment or token includes one or more of these patterns, the text data segment is marked as a candidate segment for having unit of measure information.

The candidate text data segments are then analyzed using the pattern database and one or more rules to identify whether one or more of these candidate segments include unit of measure information and the type of unit of measure information that is included in these segments. The analysis may be based on a more extensive pattern database in which more complex patterns are used to provide a more accurate determination of whether the segment includes unit of measure information. These patterns may have an associated unit of measure information type which may then be used to determine how the unit of measure information is to be converted to a format understandable by the user of the wireless communication device 210.

Having identified the units of measure in the text message data, the type of units of measure in the text message data, and the format that is either desired by the user of the wireless communication device 210 or most likely to be understandable by the user of the wireless communication device 210, conversion functions are applied to the units of measure in the text message data to convert their values to the format that is to be output to the wireless communication device 210. An example of such a conversion function is that if the unit of measure is in the form of meters per second (m/s) and the output should be in miles per hour (mi/hr), then the unit of measure value in the text message data should be multiplied by $4.4704 \times 10^{-1}$. Similarly, if the unit of measure is in the form of meter$^2$ (m$^2$) and the output to the wireless communication device 210 should be in foot$^2$ (ft$^2$), then the unit of measure value in the text message data should be multiplied by $9.2903 \times 10^{-2}$.

The converted values of the units of measure in the text message data are inserted into the text message in place of the original units of measure in the text message. The text message is then output to the wireless communication device 210 by the mobile switching center 230. Thus, the units of measure of a text message are automatically converted to a format that is most likely to be understood by the user of the destination wireless communication device 210 as determined based on an identifier of the origin of the user or preferences selected by the user.

It should be noted that, while the present invention is described above in terms of the mobile switching center 230 performing all of the functions to parse, analyze, and convert units of measure in a text message, the present invention is not limited to such an embodiment. Rather, one or more of these functions may be distributed to one or more separate devices that are in communication with the mobile switching center 230. The mobile switching center 230 may transmit requests for the various functions described above to one or more of these separate devices and receive the results of these functions.

In addition, the mobile switching center 230, and/or one of these other separate devices, may make use of information obtained from other sources to aide in the conversion of units of measure in text message data. For example, a separate device may be provided in the wireless communication network, or otherwise accessible via the wireless communication network, that provides conversion values for dynamically changing units of measure. As a concrete example, a service provider may provide current exchange rates for various currency and these exchange rates may be obtained by the mobile switching center 230, or other separate device, to aide in the conversion of currency units in text message data. Alternatively, such conversion values for dynamically changing units of measure may be stored locally in association with the mobile switching center 230, or one or more of the other separate devices discussed above.

Thus, the present invention provides an automated mechanism for converting unit of measure information from a source unit of measure representation to a destination unit of measure representation. The present invention does not require any additional hardware to be used by the user but rather, is integrated into a wireless communication device that is already associated with the user. In addition, the conversion mechanism of the present invention operates without the requirement that the user actively initiate the operation of the present invention or actively interface with the wireless communication device in order for the conversions to take place. In other words, the present invention provides automated unit of measure conversion for text messages sent to a wireless communication device, such as a cellular telephone.

Figure 3:
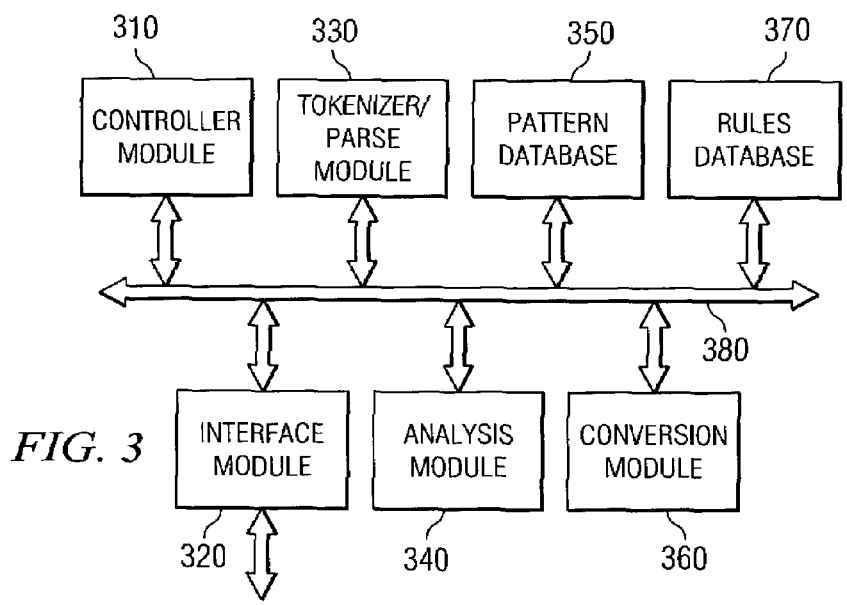
FIG. 3 is a block diagram of the primary operation components of an automated unit of measure conversion mechanism according to the present invention.

FIG. 3 is an exemplary block diagram of the primary operational components of the present invention. The elements shown in FIG. 3 may be implemented as software, hardware, or any combination of software and hardware without departing from the spirit and scope of the present invention. In a preferred embodiment, the elements of FIG. 3 are implemented as software instructions executed by one or more processors.

As shown in FIG. 3, the unit of measure conversion apparatus of the present invention includes a controller module 310, an interface module 320, a tokenize/parse module 330, an analysis module 340, a pattern database 350, conversion module 360, and a rules database 370. The elements 310-370 are in communication with one another via the control/data signal bus 380. Although a bus architecture is shown in FIG. 3, the present invention is not limited to such and any architecture that facilitates the communication of control/data signals between the elements 310-370 may be used without departing from the spirit and scope of the present invention.

The controller module 310 controls the overall operation of the apparatus and orchestrates the operation of the other elements 320-370. The interface module 320 provides an input/output interface through which text messages are received and converted text messages are output.

The tokenize/parse module 330 breaks up a received text message into segments and parses each segment to identify candidate segments that may have unit of measure information therein. The analysis module 340 analyzes the candidate segments to identify those that do have unit of measure information and to identify the type of unit of measure information that is included in those candidate segments. The tokenize/parse module 330 and analysis module 340 may make use of patterns obtained from the pattern database 350 and rules obtained from the rules database 370.

The conversion module 360 converts the unit of measure information received in the text message to a unit of measure representation appropriate for the origin of the user of the destination device, or a representation selected by the user of the destination device, as determined from a database registration of the destination device. The particular conversion performed is based on the identified type of unit of measure information in the text message, the value included for that unit of measure, and the conversion functions identified based on the identification of origin of the user of the destination device, or the selected desired output representation selected by the user of the destination device.

The conversion module 360 outputs the converted unit of measure information to the controller module 310 which then integrates this converted unit of measure information back into the text message in place of the original unit of measure information. The controller module 310 then outputs the converted text message via the interface 320.

Figure 4:
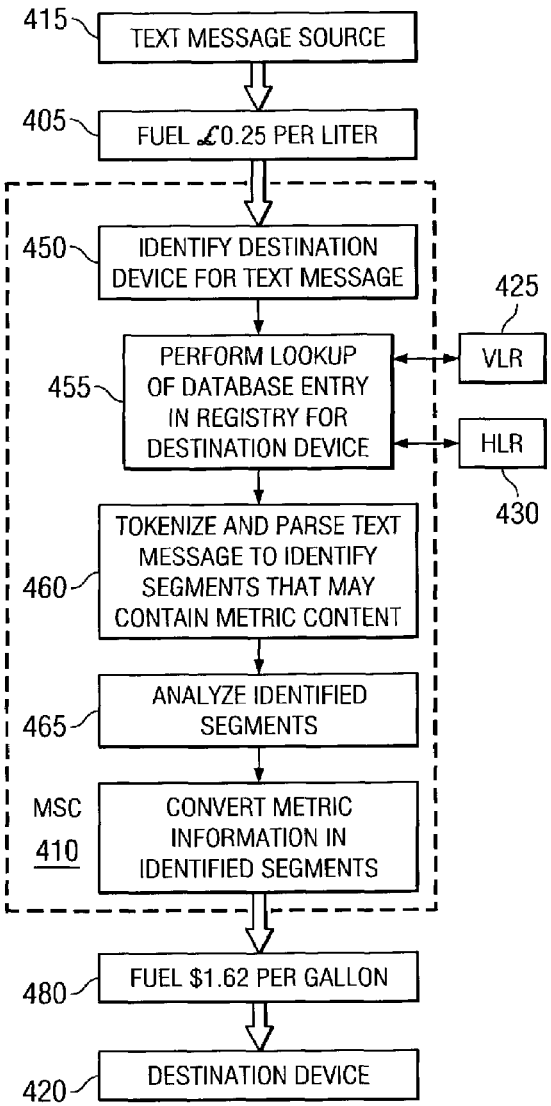
FIG. 4 is an exemplary diagram illustrating the parsing of a text message and conversion of units of measure in the text message in accordance with the present invention.

FIG. 4 is a diagram illustrating a data flow for an example text message in accordance with the present invention. As shown in FIG. 4, a text message "Fuel £0.25 per liter" 405 is received at a mobile switching center 410 from a text message source 415. The mobile switching center 410 identifies the destination device 420 from header information of the text message 405 (450) and performs a lookup in visitor location register 425 and home location register 430 to identify a database entry for the destination device 420 (455). The mobile switching center 410 also tokenizes and parses the message to identify segments containing unit of measure content (460). The segments are then analyzed to identify segments that actually do contain unit of measure information and the type of unit of measure information that they contain (465). The unit of measure information is then converted based on the identification of origin or desired output format identified from the database entry for the destination device, the type of unit of measure information, the value of the unit of measure information, and identified conversion functions (470). The converted text message "Fuel $1.62 per gallon" 480 is then output to the destination device 420 via the wireless communication network.

Figure 5:
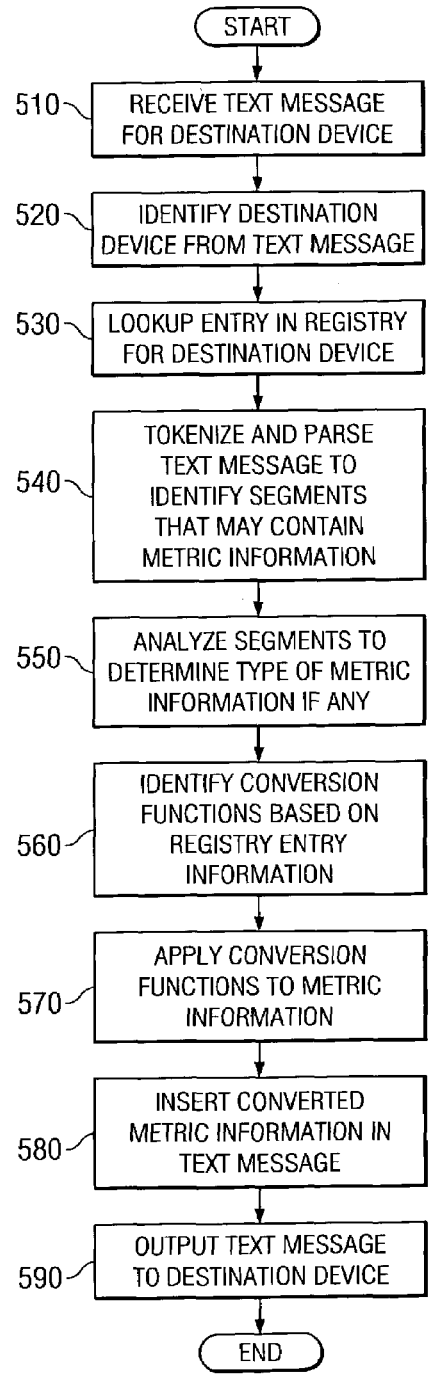
FIG. 5 is a flowchart outlining an exemplary operation of the present invention.

FIG. 5 is a flowchart outlining an exemplary operation of the present invention. It should be noted that, while FIG. 5 illustrates a series of steps, the present invention is not limited to any particular ordering of these steps and many of the steps may be performed in a different order of at approximately the same time without departing from the spirit and scope of the present invention.

As shown in FIG. 5, the operation starts with receipt of a text message directed to a destination device (step 510). The destination device is identified (step 520) and a lookup in a registry is performed to identify the particular output format to be provided to the destination device (step 530). As noted above, this output format is determined based on an identifier of origin of a user of the destination device or an indication of a desired format set by the user of the destination device.

The text message is tokenized and the segments parsed to identify those segments that may have unit of measure information (step 540). The segments that may have unit of measure information are analyzed to confirm that they have unit of measure information and the type of unit of measure information that they contain (step 550). Conversion functions for the desired output format are identified (step 560) and applied to the identified unit of measure information in segments of the text message (step 570). The converted unit of measure information is then inserted into the text message in place of the original unit of measure information (step 580). The text message with the converted unit of measure information is then output to the destination device (step 590) and the operation ends.

Thus, the present invention provides an automated system and method for converting unit of measure information in a wireless communication network. With the system and method of the present invention, the user need not be cognizant of the conversion taking place and need not actively initiate such conversions. Moreover, the functions of the present invention may be integrated into a wireless communication network and a wireless communication device that is already associated with the user thereby eliminating the need for the user to purchase or otherwise manipulate a device separate from his/her wireless communication device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of automatically converting unit of measure information in a text message to be routed to a wireless communication device via a wireless communication network, comprising:

receiving a text message that is to be routed to a destination wireless communication device;

identifying an output format for unit of measure information in the text message based on an identifier of an origin of a user of the destination wireless communication device; and converting unit of measure information in the text message to the output format wherein converting unit of measure information in the text message includes: tokenizing the text message into a plurality of segments;

identifying candidate segments from the plurality of segments that may include unit of measure information; and analyzing the candidate segments to identify segments having unit of measure information.

2. The method of claim 1, wherein the identifier of the origin of the user is a country code associated with the destination wireless communication device.

3. The method of claim 1, further comprising:

identifying a type of unit of measure information for each segment identified as having unit of measure information; and applying a conversion function to a value of the unit of measure information based on the identified type of unit of measure information for each segment identified as having unit of measure information.

4. The method of claim 3, wherein applying a conversion function includes:

retrieving conversion information from a source device; and using the conversion information from the source device to determine the conversion function.

5. The method of claim 4, wherein the conversion information is currency exchange rate information.

6. The method of claim 4, wherein the source device is a third party supplier of conversion information.

7. The method of claim 1, wherein identifying candidate segments from the plurality of segments that may include unit of measure information includes comparing text data for each segment in the plurality of segments to patterns retrieved from a pattern database.

8. The method of claim 1, wherein the unit of measure includes one or more of a distance measurement, a volume measurement, a time measurement, an area measurement, and a currency amount.

9. The method of claim 1, wherein identifying an output format for unit of measure information in the text message includes retrieving an entry associated with the destination wireless communication device from a registry, wherein the entry includes the identifier of origin of the user of the destination wireless communication device.

10. A computer program product encoded in a computer readable medium for automatically converting unit of measure information in a text message to be routed to a wireless communication device via a wireless communication network, comprising:

first instructions for receiving a text message that is to be routed to a destination wireless communication device;

second instructions for identifying an output format for unit of measure information in the text message based on an identifier of an origin of a user of the destination wireless communication device; and third instructions for converting unit of measure information in the text message to the output format wherein the third instructions for converting unit of measure information in the text message includes:

instructions for tokenizing the text message into a plurality of segments;

instructions for identifying candidate segments from the plurality of segments that may include unit of measure information; and instructions for analyzing the candidate segments to identify segments having unit of measure information.

11. The computer program product of claim 10, wherein the identifier of the origin of the user is a country code associated with the destination wireless communication device.

12. The computer program product of claim 10, further comprising:

instructions for identifying a type of unit of measure information for each segment identified as having unit of measure information; and instructions for applying a conversion function to a value of the unit of measure information based on the identified type of unit of measure information for each segment identified as having unit of measure information.

13. The computer program product of claim 12, wherein the instructions for applying a conversion function include:

instructions for retrieving conversion information from a source device; and instructions for using the conversion information from the source device to determine the conversion function.

14. The computer program product of claim 13, wherein the conversion information is currency exchange rate information.

15. The computer program product of claim 13, wherein the source device is a third party supplier of conversion information.

16. The computer program product of claim 10, wherein the instructions for identifying candidate segments from the plurality of segments that may include unit of measure information include instructions for comparing text data for each segment in the plurality of segments to patterns retrieved from a pattern database.

17. The computer program product of claim 10, wherein the unit of measure includes one or more of a distance measurement, a volume measurement, a time measurement, an area measurement, and a currency amount.

18. The computer program product of claim 10, wherein the second instructions for identifying an output format for unit of measure information in the text message include instructions for retrieving an entry associated with the destination wireless communication device from a registry, wherein the entry includes the identifier of origin of the user of the destination wireless communication device.

19. An apparatus for automatically converting unit of measure information in a text message to be routed to a wireless communication device via a wireless communication network, comprising:
means for receiving a text message that is to be routed to a destination wireless communication device;
means for identifying an output format for unit of measure information in the text message based on an identifier of an origin of a user of the destination wireless communication device; and
means for converting unit of measure information in the text message to the output format
wherein the means for converting unit of measure information in the text message includes:
means for tokenizing the text message into a plurality of segments; means for identifying candidate segments from the plurality of segments that may include unit of measure information; and
means for analyzing the candidate segments to identify segments having unit of measure information.

20. The apparatus of claim 19, wherein the identifier of the origin of the user is a country code associated with the destination wireless communication device.

21. The apparatus of claim 19, further comprising:
means for identifying a type of unit of measure information for each segment identified as having unit of measure information; and
means for applying a conversion function to a value of the unit of measure information based on the identified type of unit of measure information for each segment identified as having unit of measure information.

22. The apparatus of claim 21, wherein applying a conversion function includes:
means for retrieving conversion information from a source device; and
means for using the conversion information from the source device to determine the conversion function.

23. The apparatus of claim 22, wherein the conversion information is currency exchange rate information.

24. The apparatus of claim 22, wherein the source device is a third party supplier of conversion information.

25. The apparatus of claim 19, wherein the means for identifying candidate segments from the plurality of segments that may include unit of measure information includes means for comparing text data for each segment in the plurality of segments to patterns retrieved from a pattern database.

26. The apparatus of claim 19, wherein the unit of measure includes one or more of a distance measurement, a volume measurement, a time measurement, an area measurement, and a currency amount.

27. The apparatus of claim 19, wherein the means for identifying an output format for unit of measure information in the text message includes means for retrieving an entry associated with the destination wireless communication device from a registry, wherein the entry includes the identifier of origin of the user of the destination wireless communication device.

* * * * *